United States Patent
Jasinschi et al.

(10) Patent No.: US 7,373,336 B2
(45) Date of Patent: May 13, 2008

(54) CONTENT AUGMENTATION BASED ON PERSONAL PROFILES

(75) Inventors: Radu S. Jasinschi, Ossining, NY (US); Nevenka Dimitrova, Yorktown Heights, NY (US); John Zimmerman, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1083 days.

(21) Appl. No.: 10/165,904

(22) Filed: Jun. 10, 2002

(65) Prior Publication Data

US 2003/0229629 A1    Dec. 11, 2003

(51) Int. Cl.
*G06F 17/30* (2006.01)

(52) U.S. Cl. .................... 707/3; 707/4; 707/5
(58) Field of Classification Search ............ 707/1–10, 707/100–104.1, 200–206
See application file for complete search history.

(56) References Cited

U.S. PATENT DOCUMENTS

| | | | | |
|---|---|---|---|---|
| 6,411,949 B1 * | 6/2002 | Schaffer | .................. | 707/2 |
| 6,654,735 B1 * | 11/2003 | Eichstaedt et al. | ............. | 707/3 |
| 6,662,177 B1 * | 12/2003 | Martino et al. | ................ | 707/3 |

FOREIGN PATENT DOCUMENTS

| | | |
|---|---|---|
| WO | WO0113264 | 2/2001 |
| WO | WO0128240 | 4/2001 |
| WO | WO0172040 | 9/2001 |
| WO | WO0237850 | 5/2002 |

* cited by examiner

*Primary Examiner*—Jean Bolte Fleurantin

(57) ABSTRACT

A method, process and system for performing content augmentation of personal profiles includes (a) building a user history of a plurality of augmented content information of relevant TV programs; (b) analyzing user queries and determining a degree to which the user queried for additional content information; (c) inferring values about the user from user queries for additional content information so as to augment the additional content information; (d) updating the augmented content information to at least one of the user history, Internet and specialized databases; (e) linking individual ones of the plurality of augmented content information to each other; and (f) determining inferences about the user's interests and preferences based on the linkage of the plurality of augmented content information. The updating of the augmented content information includes segmenting and indexing of multimedia content. A feedback system is created where user queries for more information and purchases from the Internet and specialized databases will result in additional augmented content information about the particular user.

24 Claims, 3 Drawing Sheets

CONTENT AUGMENTATION BASED ON PERSONAL PROFILES

BACKGROUND OF THE INVENTION

1. Field of the Invention

The invention relates to systems used to generate, update and transform TV personal preference profiles. More particularly, the present invention relates to a content augmentation system.

2. Description of the Related Art

In the prior art, there are known personal profiles technology systems, such as TiVo™ related personal digital recorder systems. In such prior art systems, a user must explicitly input program preferences in order for the system to record whole TV programs and recommend future programs. Such technology is referred to in the art as "pull" technology that is used in the personal digital recorders. Such pull technology is limited to the inputs provided by the user, or possibly prompted by the system. Also, it is difficult to know truly to what degree a user would like or dislike a particular program based on the personal preference previously input, because there are many different nuances as to what can make a user like or dislike a particular program, and also affect to what degree their likes or dislikes can be quantitatively anticipated.

One issue, for example, is that while a person might signify a personal preference for watching "western" movies, that person might have a dislike for a particular actor or actress, or the story line of a particular movie that might not be recognized as a western by a system using only explicit user inputs. Moreover, as a program can run anywhere from several minutes to several hours, it could be difficult to ascertain what in the program is actually liked or disliked, based on personal profiles created by pull technology.

SUMMARY OF THE INVENTION

It is, therefore, an object of the present invention to provide content augmentation to generate, update and transform TV personal profiles. The content augmentation corresponds to the particular TV program data that is relevant content information.

According to the present invention, both push and pull technologies (push technology allows data to be sent automatically) is used to ascertain implicit preferences based on actual viewing patterns. The invention permits the user to watch not only a preferred program, but to browse for specific multi-media content related to the preferred TV program, conduct TV-based and Internet-based commerce, and interact via push and pull modes.

In a first aspect of the present invention, a process for performing content augmentation of personal profiles includes (a) building a user's history of augmented content for indexing content information of relevant TV programs;

(b) analyzing user queries and determining the depth in which a user request for more information, for example, superficial queries for one particular subject relative to another subject in which the number and quality of queries increases;

(c) inferring values from user requests for more information, such as curiosity, knowledge, frugality, quantity, fashion, false pretenses, etc.;

(d) relating the augmented content information to the Internet and to specialized databases; and (e) linking augmented contents between themselves and drawing inferences about the user's interests and preferences. Thus, the user's response may be used to create a full feed back system heretofore unknown in the prior art.

In another aspect of the present invention, a process for performing content augmentation of personal profiles comprises:

(a) building a user history of a plurality of augmented content information of relevant TV programs;

(b) analyzing user queries and determining a degree to which the user queried for additional content information;

(c) inferring values about the user from user queries for additional content information;

(d) updating the augmented content information to at least one of the Internet and to specialized databases;

(e) linking individual ones of the plurality of augmented content information to each other; and (f) determining inferences about the user's interests and preferences based on the linkage of the plurality of augmented content information.

The method may further comprise: (g) creating a feedback system by updating the user history in step (a) with the determination about user's interests and preferences from step (f).

The method may include that updating of the augmented content information in step (d) includes segmenting and indexing of the plurality of augmented content information.

The method may include prompting the user in a push mode to engage in communication with one of the Internet and specialized databases updated in step (d) with the augmented content information.

The method may also include prompting the user in a push mode to purchase items associated with said one of the Internet and specialized databases updated in step (d) with the augmented content information.

Heretofore unknown in the prior art, the segmenting and indexing can be performed on multimedia.

The determination of the degree to which the user queries for additional content information may include categorizing superficial queries for a first particular subject relative to a second particular subject by counting a number of superficial queries for each of the first and second particular subjects.

In addition, in one embodiment of the method of the present invention the determining of the degree to which the user queries for additional content information in step (b) may include determining a depth of the queries based on a predetermined correlation of a particular user query and a value of the depth assigned to the particular user query.

The inferred values include designation of at least one user trait selected from the group consisting of curiosity, knowledge, frugality, quantity, fashion, and false pretenses.

The segmenting and indexing of the multimedia may include the sub-steps of:

(i) feature extraction;

(ii) pause detection;

(iii) automatic segmentation; and (iv) automatic audio classification.

The segmenting and indexing can be based on cepstral-based features. The cepstral-based features may include MFCC and LPC.

Alternatively, the segmenting and indexing is based on a combination of cepstral-based features, frequency-domain operations and temporal-domain operations to extract acoustical features, temporal and spectral features.

DETAILED DESCRIPTION OF THE PREFERRED EMBODIMENT

Figure 1:
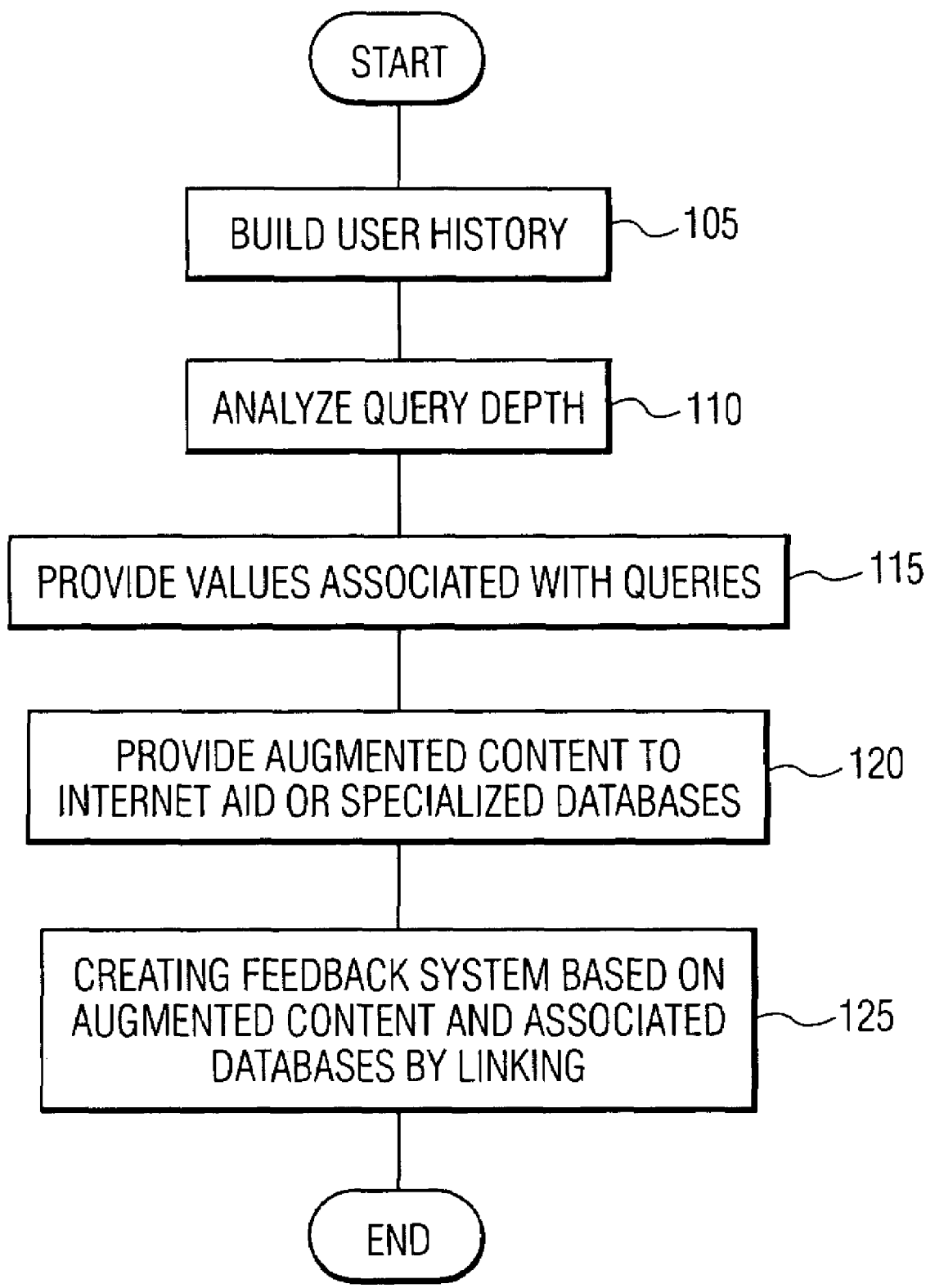
FIG. 1 depicts a flow chart illustrating a first aspect of the present invention.

FIG. 1 is a flow chart illustrating the first aspect of the present invention. At step 105, a user history of augmented content is built. The augmented content, which includes commercials, is used for indexing relevant TV program content information. One way that the content information may be determined can be by extracting closed-captioned text. By examining closed-captioned text, it would be possible to determine the title of the program that is being watched by the viewer, for example, according to the method disclosed by commonly owned and assigned U.S. patent application Ser. No. 09/441,943 entitled "Video Stream Classification Symbol Isolation Method and System, filed Nov. 17, 1999, in which optical character recognition can be applied to the subtitles of video or transcript information for identification. Thus, if the caption for "Cheers" appears in the closed captioned text, this can be identified and recorded to build a profile.

Another way that the user history can be built is by correlating the program being watched with an electronic program guide (EPG) that displays listings for the available channels. It is common for both cable television and satellite television systems to dedicate a channel that displays a listing of all the programs. Often the EPG displays the channel, the starting and end times, the title, the names of staring actors and may even include a short synopsis of the story line. When a viewer is watching a particular channel, the channel, and time can be used with the associated listing in the electronic program guide to identify the show being watched.

In addition, as it is not uncommon for cable and/or satellite systems to format program data, and this information can be downloaded via a phone line, fiber optic line, and wire or wireless network, and can be downloaded on demand or according to a specific schedule. The system used to build the viewer history and provide content augmentation can be a computer, a controller within a television, a set top box, or could be the server of a communications network and/or Internet server. The user history can be built locally in the user device, or by the server of a network, and/or cable television company, satellite television company, and/or Internet service provider.

In particular, as cable television and/or satellite boxes are often addressable, the viewing information can be periodically uploaded. The building of the user history in this manner is implicit in that the user does not expressly provide feedback or indicate likes/dislikes. Thus, the history built at step 105 can be regarded as a push mode.

For example, as an electronic programming guide already identifies shows by types (comedy, drama, documentary) of categories, and there is further identification of the subject matter (such as titles). Accordingly, if someone watches Seinfeld several times per week (the show is currently on in reruns every day), the user history can be built indicating a preference for comedy. If there are other comedies that are also viewed, the user history can be updated to identify more subtle preferences (For example, if the user history indicates a number of viewing of "Cheers" and a viewing of "Frasier" there is a commonality in that actor Kelsey Grammer is in both programs. Moreover, if the person watches "Cheers" and "Becker" it may indicate a like for actor Ted Danson, and the profile history can be updated with this information. If the profile history is further updated by the viewing of, for example, movies such as "Three Men and A Baby" and "Creep Show" (both of which Ted Danson appears in). Thus, the profile based on implicit viewing can often accurately indicate a viewer preference in lieu of or in addition to, explicit feedback.

In addition to preparing a personal profile based on implicit viewing, the content information is segmented and indexed. The length of the segments could be predetermined amounts of time, or the time period between the end of one commercial break and the start of another commercial break, etc. This indexing of segments can occur by the use of, for example, a frame grabber in the case of raw video, such as NTSC, or by a frame parser for compressed video, such as MPEG. One example of a frame grabber can be that used by the Intel™ Smart Video Recorder III.

According to the present invention, as illustrated at step 110, queries can also be provided to the user, and the responses given by the user can be analyzed to create a more accurate user profile.

For example, if the user watches Star Trek, which is identified by either the closed captioned text, or in correlation with the electronic programming guide for the show being displayed on a particular channel at the time of viewing, a series of databases and/or networks (including but not limited to Internet) can be accessed to automatically provide information about Star Trek. This information can be prompted to the user initially as a general query that could be narrowed by subsequent user responses.

It should also be understood by a person of ordinary skill in the art that a voice recognition system can be used rather than keying in of names, places, etc. Moreover, it is possible that the monitor is a touch screen, or a pointing device, such as a mouse, can be used. For each level of additional questions, a greater level of depth can be assigned. For example, as the user first selects the view information about Star Trek, then specifies actors, then specifies William Shatner, this could be a sign a depth level of, for example, three. In addition, prompts can also be provided, for example, when a user is viewing a sporting event. This process would enable a viewer to receive augmented information about his/her favorite team, player, history of the player on the team, history of the sport in general, or perhaps view other games, such as previously played Super Bowls, World Series, etc.

At step 115, values associated with the query depth of step 110 are provided to associate categories for additional content augmentation. For example, it can be determined, based on the user queries and the viewing history, that the user has a preference for trivia (by the viewing history that indicates watching game shows that test knowledge and in combination with the depth of the queries and their subject. Known fusion techniques can be use to fuse information obtained from both push and pull modes (i.e. from user viewing history and query depth) that can be identified with values.

At step 120, once the values have been identified, these values can be used to provide augmented content information from the specialized databases and/or the Internet.

Finally, at step 125, a feedback system is created based on the augmented content that is selected by the user and inferences about the user's interest and preferences as compared to a database of preferences of individual users, whereby some of the content augmentation is based on other items enjoyed by similarly matched users. Thus the linking of augmented contents and the associated databases and the degree to which they are selected for viewing by the user, is used to update the user's history of augmented content.

For example, the user can be asked whether they would like to receive augmented information about Star Trek. If the user declines, it would be assumed that the depth of interest is at its lowest level. Of course, there could be many other factors involved such as the user does not want to interrupt the present program viewing, or may not be in a particular mood to receive augmented information about Star Trek, such as being prompted if they would like to receive information about the filming of a particular episode, or about one/several of the actors or directors. The level of content augmentation can be increased with each response For example, the user may indicate that he/she would like more information about a particular actor (i.e. example, William Shattner) of the show. The initial augmented content could be data regarding William Shattner's portrayal of Captain Kirk in a book written about Star Trek. There can be a prompt to select more choices, which, for example, could offer a complete biography of William Shattner, or a DVD catalog of all the movies/television programs, which he has appeared.

For example, in the case of the predetermined series of categories, if the user affirmatively selects that he/she would like more information about Star Trek, sub-categories can be prompted to the user such as "actors", "producer", and "director". After selecting, for example, actor, there can be a search conducted pausing for information that includes Star Trek and actors. Alternatively, the user could key in (the name of the particular actor and/or character from the program. For example, keying in the name of "Kirk" or "William Shattner". Thus a search would be performed using Star Trek and William Shattner.

Thus, according to the present invention, simple TV personal profiles are transformed into content augmentated files, based on the user's interaction that includes penalizing the style of content augmentated information which is accepted, and then analyzing queries and responses given by the user.

In yet another aspect of the present invention, the user may not only watch preferred TV programs and receive augmented content, but the invention will permit the browsing for specific multi-media content related to the preferred TV program, and permit TV-based and Internet-based commerce; and with each action on the part of the user, further refining the user history for more precise content augmentation.

For example, the system watches a user's style of accepting augmented information and analyzes the queries and the responses that the user gives. The device can collect data in addition to the data about the user's request. For example, based on a user's response, the device might collect information from Web Sites about actors that perform on Star Trek without having the users having to ask for same. One way such preferences can be anticipated is to link individual segments of augmented content information with each other, so that a pattern may emerge of likes and dislikes.

In addition, the system can prompt the user as to whether they would like to purchase, for example, Star Trek memorabilia, or DVD's of certain episodes, or download an episode for viewing, etc.

Another feature of the present invention is that multimedia content information used to build a personal profile can be segmented and indexed. With regard to such segments and indexes, cepstral-based features such as MFCC and LPC tend to provide better classification accuracy compared to temporal and spectral features.

As disclosed in *Classification of General Audio Data for Content-Based Retrieval*, Dongge Li, Ishwar K. Sethi, Nevenka Dimitrova and Tom McGee (199x?), the contents of which are hereby incorporated by reference, discloses that in addition to MFCC and LPC, a toolbox of different tools, with each tool being responsible for a single basic operation that is frequently required for the analysis of audio data.

The toolbox can include frequency-domain operations, temporal-domain operations, and mathematical operations such as short-time averaging, log operations, windowing, clipping, etc. There can be an extraction of acoustical features, including MFCC, LPC, delta MFCC, delta LPC, autocorrelation MFCC, and temporal and spectral features.

For example, to segment and index the audio from multimedia content, there can be four processing steps comprising: (1) feature extraction; (2) pause detection; (3) automatic audio segmentation; and (4) automatic audio classification.

Feature extraction can be implemented using the toolbox previously discussed. During the run time, for example, acoustical features can be measured along the time axis from the input audio raw data and extracted frame by frame.

Pause detection can be used to separate the input audio signal into silence segments and clip segments. Thus a pause is a time period where there is a lack of sound (or a lack of sound detected by the listener). As noted in the *Classification of General Audio Data for Content-Based Retrieval* (previously cited), the pause detector generates results consistent with human perception.

While the silence segments do not require additional processing, prior to classification the clip segments need to be processed to identify transition points. The audio segmentation can, for example, use break merging and break detection. Break detection includes moving a large detection window over the signal segment and a comparison of the average energy of different halves at each sliding portion.

Figure 2:
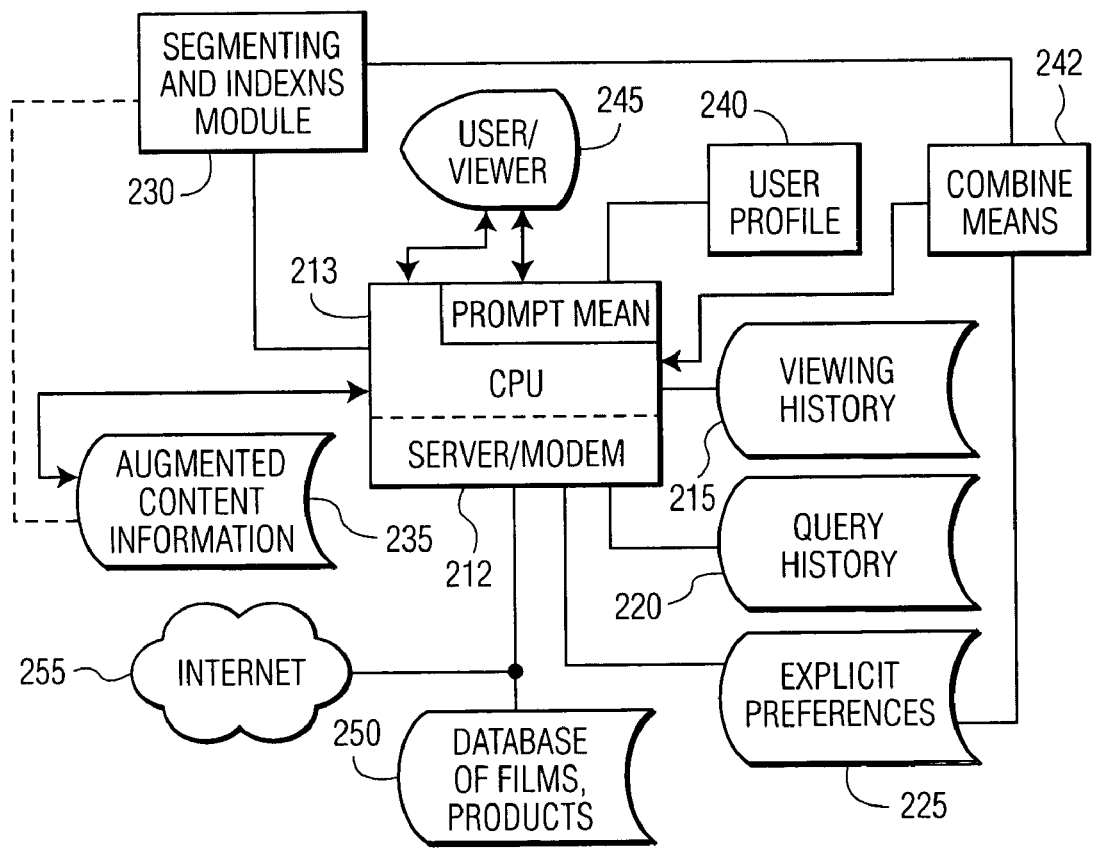
FIG. 2 depicts an overview of a system according to the present invention.

FIG. 2 illustrates an overview of a system according to the present invention. It is to be understood by persons of ordinary skill and others that FIG. 2 is provided for purposes of illustration and not for limitation. A person of ordinary skill in the art understand that there are various modifications that are within the spirit of the invention and the scope of the appended claims.

As shown in FIG. 2, a processing unit 210 is central to the system. It is to be understood that the processor 210 may be a microprocessor/microcontroller that is part of a set top box. The processor 210 may be part of a TIVO® or other type of system. Communicating with the processor 210 are areas of storage labeled viewing history 215, query history 220, and explicit preferences 225. These storage areas can be arranged within the set top box, and may use any type of available storage, including but not limited to magnetic, optical, magneto-optical, electronic, etc.

The capacities of the viewing history 215, query history 220 and explicit preferences 225 can be set according to need. For example, it may be desirable to store viewing history for a certain period of time (such as months, weeks, days) and its associated query history. The system may periodically purge the history after some predetermined threshold has been reached in terms of time, quantity of items in the history, etc.

The segmenting and indexing module 230 performs segmenting and indexing of content, including multimedia content, to provide classification of the content of what the view is watching. Multimedia information spans three domains: visual, audio, and transcript, as any one of the domains is a sub-component. The content can be segmented and indexed according to different levels of detail, depending on, for example, spatial or temporal scales. A paper entitled "A Probabilistic Layered Framework for Integrating Multimedia Content and Context Information" by R. S. Jasinschi, N. Dimitrova, T. McGee, L. Agnihotri, J. Zimmerman, D. Li, and J. Louie, discloses that concepts of granularity and abstraction. With regard to visual domain spatial-granularity, there is employed a granularity scale.

The granularity may be defined as local (pixels, voxels), regional or global. With regard to abstraction, there can be a description of semantic information. Semantic information is based on relationships among different objects. Television and movies have a semantically rich content.

Figure 3:
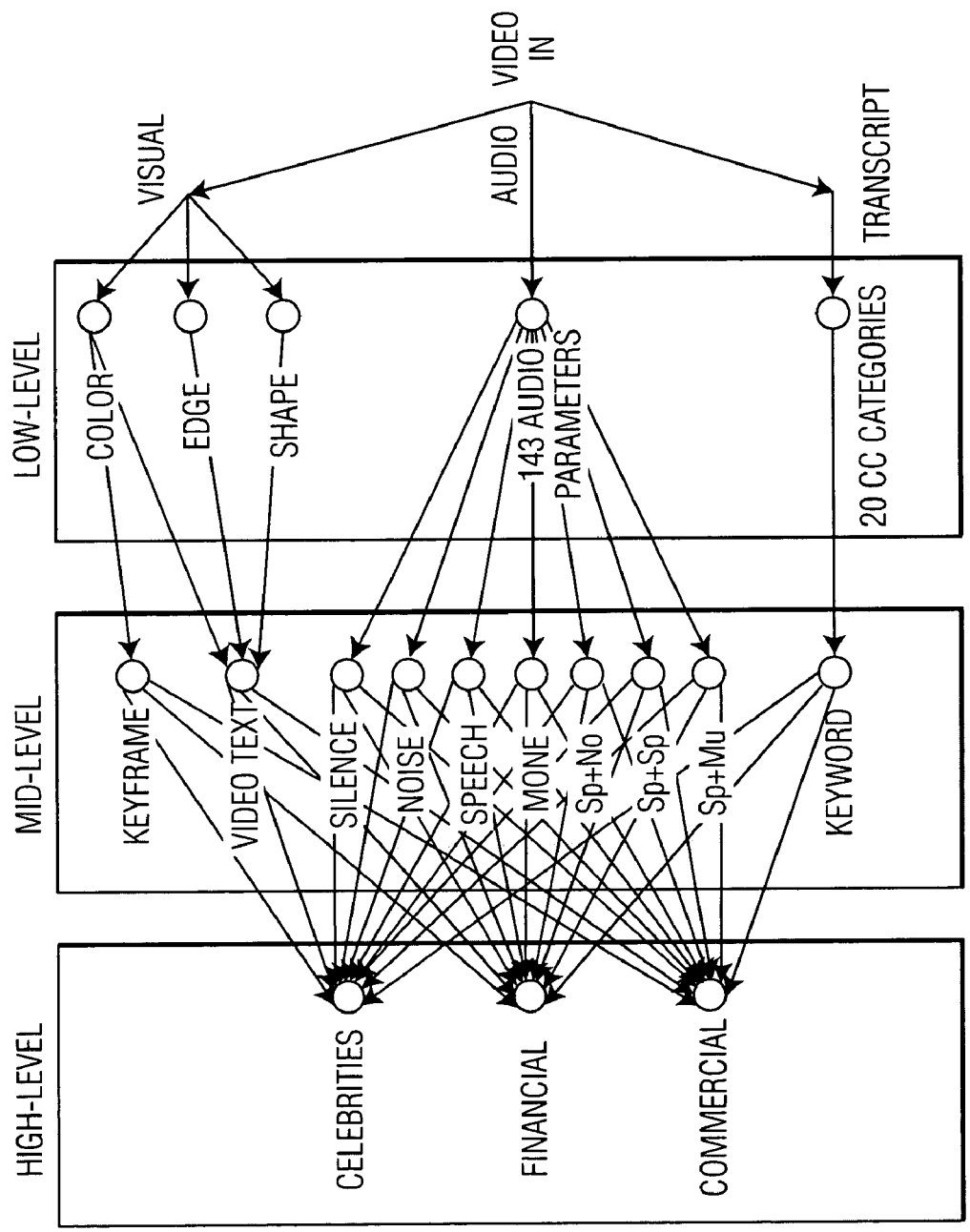
FIG. 3 is an illustration of categories of content information (low-level, mid-level, and high-level) used for segmenting and indexing.

FIG. 3 depicts that the objects related within each level of granularity produce different levels of abstraction. The levels of abstraction can be categorized as low, mid-level, and high level. Low levels focus on individual objects. Mid-level relates to objects and infers events. High level relates to the events.

Multimedia information can be divided into visual, audio, and transcript, and a signature, pattern, or underlying structure can be used so as to constrain the content information. The content layer receives a visual, audio, and text stream from the decoded video. The content layer may comprise the low-level, mid-level, and high-level of abstraction. The low-level visual information includes pixel-based color, shape, and edge attributes. Mid-level visual features comprise keyframes. videotext, and faces. The audio categories can include speech, music, noise, speech plus noise, speech plus speech, speech plus music, and silence. The high level comprises program segments according to topics.

As previously discussed, cepstral-based features such as MFCC and LPC can be used by the module 230. Also, the module may contain the "toolbox" (as previously discussed) that can be used for the analysis of audio data. The segmenting and indexing module will contain the necessary software to segment and index, for example, by utilizing feature extraction, which can be manual or automatic and includes pause detection, and audio classification. The module 230 may contain more or less than the above mentioned features, provided that the segmenting and indexing of multimedia content is performed.

The segmenting and indexing is used to by the processor to provide augmented contented information of the viewing history, query history and explicit preferences along with the segmented and indexed content. This augmented content information can be stored, for example, at area 235. The augmented content information can be stored as a user profile 240, or used by the processor to update the user profile 240 in a type of feedback system, whereby each time the augmented content information is updated, the user profile may be updated.

The user profile may, for example, have data stored which is associated with values of the user. For example, if the user shows a strong interest in a particular area based on the depth of queries or time spent, the user profile may be contain a score that is part of range, with the particular score for that area identifying the user's degree of interest. For example, if the range of values are from 1 to 10, and the user/viewer is very big sports fan, the user profile might contain a 10 for football (and football related trivia and products) based on the augmented content information, but only a 4 for soccer, and a 2 for baseball.

The contents of the viewing history, query history and explicit preferences (which is optional, but is believed to assist in determining user likes and dislikes) that can be analyzed may have many more categories than presented in FIG. 2. In addition, the augmented content information can be updated each time the user/viewer 245 makes a purchase or accesses specialized databases 250 and/or the Internet 255.

The user can receive prompts for goods and services as a result of the augmented content information, which could be uploaded to the specialized databases and/or the Internet. Of course, each time a purchase is made, or an item is downloaded (such as a video clip of a historical event, music video, etc. etc.) this information can be used to update the augmented content information.

Various modifications can be made by a person of ordinary skill in the art that are within the spirit of the invention and the scope of the appended claims. For example, the types of classifications, the type of segmenting and indexing, the arrangement of communication of the modules, could all be modified without departing from the present invention, as every possible configuration has not been presented.

What is claimed is:

1. A method for performing content augmentation of personal profiles comprising:
   (a) building a user history of a plurality of augmented content information of relevant TV programs;
   (b) analyzing user queries and determining a degree to which the user queried for additional content information;
   (c) inferring values about the user from the user queries for additional content information in step (b) so as to augment the additional content information;
   (d) updating the augmented content information to at least one of the user history, Internet and specialized databases; and
   (e) linking individual ones of the plurality of augmented content information to each other;
   (f) determining inferences about the user's interests and preferences based on the linkage of the plurality of augmented content information.

2. The method according to claim 1, further comprising:
   (g) creating a feedback system by updating the user history in step (a) with the determination about user's interests and preferences from step (f).

3. The method according to claim 1, wherein the updating of the augmented content information in step (d) includes segmenting and indexing of the plurality of augmented content information, and wherein the segmenting and indexing is performed on multimedia.

4. The method according to claim 3, further comprising prompting the user in a push mode to engage in communication with one of the Internet and specialized databases updated in step (d) with the augmented content information.

5. The method according to claim 3, further comprising prompting the user in a push mode to purchase items associated with said one of the Internet and specialized databases updated in step (d) with the augmented content information.

6. The method according to claim 1, wherein the determining of the degree to which the user queried for additional content information includes categorizing superficial queries for a first particular subject relative to a second particular subject by counting a number of superficial queries for each of the first and second particular subjects.

7. The method according to claim 1, wherein the determining of the degree to which the user queried for additional content information in step (b) includes determining a depth of the queries based on a predetermined correlation of a particular user query and a value of the depth assigned to the particular user query.

8. The method according to claim 1, wherein the inferred values include designation of at least one user trait selected from the group comprising of curiosity, knowledge, frugality, quantity, fashion, and false pretenses.

9. The method according to claim 6, wherein the segmenting and indexing of the multimedia includes:
   (i) automatic feature extraction from at least one of a visual stream, an audio stream, and a transcript stream by determining low-level, mid-level, and high level features; and
   (ii) automatic audio classification that corresponds to predetermined categories including more than one of silence, noise, speech, music, speech plus noise, speech plus speech, speech plus music.

10. The method according to claim 9, wherein the lower level features comprise pixel-based color, shape and edge attributes, the mid-level features include keyframes, faces and videotext including audio features, and the high level features are classified according to topics, and wherein the automatic audio classification.

11. The method according to claim 3, wherein the segmenting and indexing is performed by combining cepstral-based features, frequency-domain operations and temporal-domain operations to extract acoustical features, spectral and temporal features.

12. A content augmentation system comprising:
   a processor;
   means for storing content information comprising viewing history and query history of a viewer, said means for storing being in communication with the processor;
   means for analyzing a degree to which a viewer queried for additional content information;
   means for segmenting and indexing multimedia content watched by a viewer to provide augmented content information;
   means for storage of the augmented contented information;
   a viewer profile identifying a viewer and associated augmented content information that has been linked to each other;
   means for linking the viewer profile with one of the Internet and specialized databases and for updating the viewer profile with information from the Internet and specialized databases regarding the viewing of the Internet and specialized database by the viewer.

13. The system according to claim 12, wherein the means for segmenting and indexing multimedia uses cepstral-based features.

14. The system according to claim 13, wherein the cepstral-based features include MFCC and LPC.

15. The system according to claim 12, wherein the means for segmenting and indexing includes a combination of cepstral-based features, frequency-domain operations and temporal-domain operations to extract acoustical features, spectral and temporal features.

16. The system according to claim 13, further comprising means for prompting a viewer in a push mode to engage in communication with one of the Internet and specialized databases.

17. The system according to claim 13, further comprising means for combining explicit viewer preferences with the segmenting and indexing.

18. The system according to claim 13, wherein the means for analyzing includes means for updating a viewer profile with quantitative values associated with the additional content information queried by a viewer and the degree to which the additional content information is queried.

19. A content augmentation device comprising:
   a processor;
   a first storage area for storing content information comprising viewing history and query history of a viewer, said means for storing being in communication with the processor;
   means for analyzing a degree to which a viewer queried for additional content information;
   means for segmenting and indexing multimedia content watched by a viewer to provide augmented content information;
   a second storage area for storage of the augmented contented information;
   a viewer profile identifying a viewer and associated augmented content information that has been linked to each other;
   means for linking the viewer profile with one of the Internet and specialized databases and for updating the viewer profile with information from the Internet and specialized databases regarding the viewing of the Internet and specialized database by the viewer.

20. The device according to claim 19, wherein the means for segmenting and indexing multimedia uses cepstral-based features.

21. The device according to claim 19, wherein the cepstral-based features include MFCC and LPC.

22. The device according to claim 19, wherein the means for segmenting and indexing includes a combination of cepstral-based based features, frequency-domain operations and temporal-domain operations to extract acoustical features, spectral and temporal features.

23. The device according to claim 20, further comprising means for prompting a viewer in a push mode to engage in communication with one of the Internet and specialized databases.

24. The device according to claim 19, further comprising means for combining explicit viewer preferences with the segmenting and indexing.

* * * * *